United States Patent [19]
Persidok

[11] 3,771,057
[45] Nov. 6, 1973

[54] METHOD AND APPARATUS FOR MEASURING IMPEDANCE IN THE PRESENCE OF UNWANTED SIGNALS

[75] Inventor: Jacek Antoni Persidok, Chicago, Ill.

[73] Assignee: Ecos Electronics Corporation, Chicago, Ill.

[22] Filed: July 10, 1972

[21] Appl. No.: 270,148

[52] U.S. Cl. ............................................. 324/57 R
[51] Int. Cl. ............................................. G01r 27/00
[58] Field of Search ............ 324/57 R, 57 N, 57 PS, 324/57 H

[56] References Cited
UNITED STATES PATENTS

| | | | |
|---|---|---|---|
| 2,143,094 | 1/1939 | Swift | 324/57 R |
| 2,988,693 | 6/1961 | Billig et al. | 324/57 R |
| 3,005,151 | 10/1961 | Ule | 324/57 R |
| 3,072,845 | 1/1963 | Bruck | 324/57 R |
| 3,464,006 | 8/1969 | Kaylie | 324/57 R |

Primary Examiner—Stanley T. Krawczewicz
Attorney—Charles J. Merriam et al.

[57] ABSTRACT

Method and apparatus for measuring an unknown impedance in the presence of extraneous signals by injecting into the impedance to be measured an oscillating current signal, which may be modulated, generating in the unknown impedance an oscillating voltage signal, applying the generated signal and any extraneous signals present in the circuit under test to a switch which is keyed by the injected current pulse so as to conduct only during the times the injected pulse has a given polarity, thereby producing through the switch a signal of a pulsating nature, and filtering the pulsating signal to produce a DC voltage, the magnitude of which is a measure of the unknown impedance.

10 Claims, 7 Drawing Figures

METHOD AND APPARATUS FOR MEASURING IMPEDANCE IN THE PRESENCE OF UNWANTED SIGNALS

This invention relates to a novel method and apparatus for measuring impedance in the presence of unwanted signals. More particularly it relates to a method and apparatus for measuring impedance by injecting current into the test circuit and measuring the resulting voltage, even in the presence of unwanted signals of large amplitude, which unwanted signals may be in the form of DC or AC regular pattern signals or random noise.

A conventional method of measuring the impedance of an electrical circuit is by injecting a current pulse into the circuit and measuring the voltage which is produced in the circuit under test as a result of the current which is injected. In order for this method to produce accurate results, however, it is essential that the voltage measured in the unknown impedance be solely that resulting from the injected current pulse. If in addition to the voltage produced by the test current pulse, there are also present in the circuit other extraneous voltage signals, the measured voltage will now be an accurate measure of the unknown impedance. For this reason it has been generally required that the circuit under test be entirely deactivated so that no voltage signals be present therein other than that resulting from the injected current pulse.

The method and apparatus of the invention permit an impedance measurement to be made even though there are present in the test circuit extraneous signals, whether of DC or AC regular pattern form or of random noise, and in spite of the fact that the unwanted signals may have an amplitude as much as 100 dB or more above the amplitude of the injected test signal. Accordingly, in accordance with the invention it is not necessary to deactivate a circuit in order to measure an unknown impedance therein.

Briefly described, the method of the invention involves injecting into the impedance to be measured an oscillating current signal, which may be modulated, generating in the unknown impedance an oscillating voltage signal, applying the generated signal and any extraneous signals present in the circuit under test to a switch which is keyed by the injected current pulse so as to conduct only during the times the injected pulse has a given polarity, thereby producing through the switch a signal of a pulsating nature, and filtering the pulsating signal to produce a DC voltage, the magnitude of which is a measure of the unknown impedance.

The invention will be better understood from the following detailed description thereof, taken in conjunction with the accompanying drawings, in which.

Figure 2:
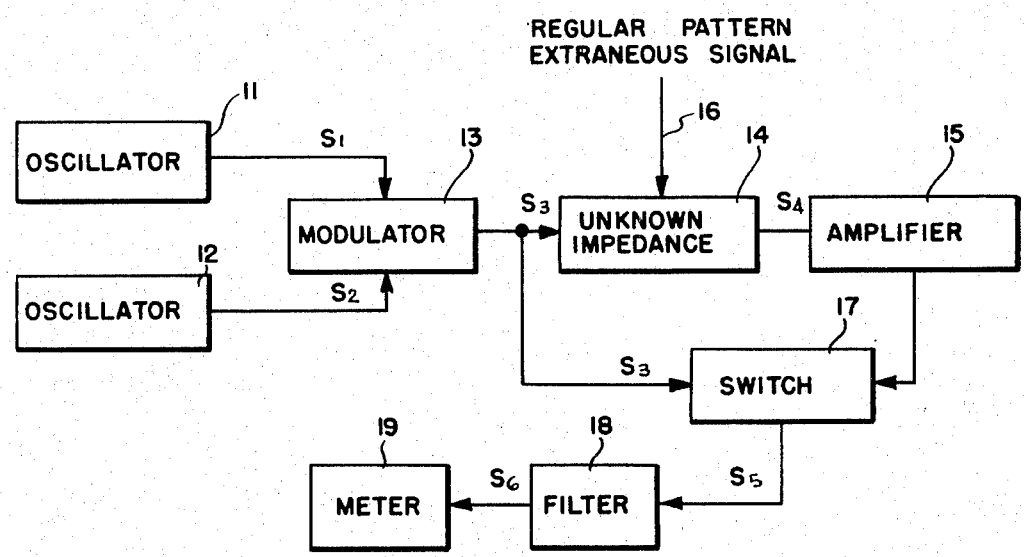
FIG. 2 is a block diagram of an embodiment of the invention in which the injected signal is frequency-or phase-modulated and the interfering signal has a regular pattern.

In the drawings, FIG. 2 is a block diagram illustrating the method of the invention as applied to the measurement of an unknown impedance $R_x$ in the presence of an unwanted or extraneous signal having a regular pattern, as opposed to random noise. As shown, first oscillator 11 generates a signal $S_1$ of frequency $f_1$ while second oscillator 12 generates a signal $S_2$ of a frequency $f_2$ less than $f_1$. Signals $S_1$ and $S_2$ are supplied to modulator 13, in which $S_1$ is modulated in a phase or frequency manner by $S_2$, as described below. The modulated output $S_3$ is applied to the unknown impedance 14 ($R_x$) to which there may also be supplied through conductor 16 an unwanted or extraneous signal having a regular pattern. As a result of the application to the unknown impedance 14 of signal $S_3$ from modulator 13 as well as the unwanted regular pattern signal 16, there is produced a signal $S_4$ which is a composite of the modulated signal $S_3$ and the unwanted signal 16. Composite signal $S_4$ is amplified by amplifier 15 and applied to electronic switch 17 which is keyed by output $S_3$ of modulator 13 so as to be closed only during such time periods as the modulated signal $S_3$ from modulator 13 has a given polarity, e.g., negative. The signal $S_5$ which passes through switch 17 is filtered by filter 18 and applied to meter 19 which measures only the portion of signal $S_5$ generated by signal $S_3$ in unknown impedance 14, extraneous signal 16 having been filtered out of signal $S_5$ applied to meter 19. The reading of meter 19 is then a measure of unknown impedance 14.

Figure 3:
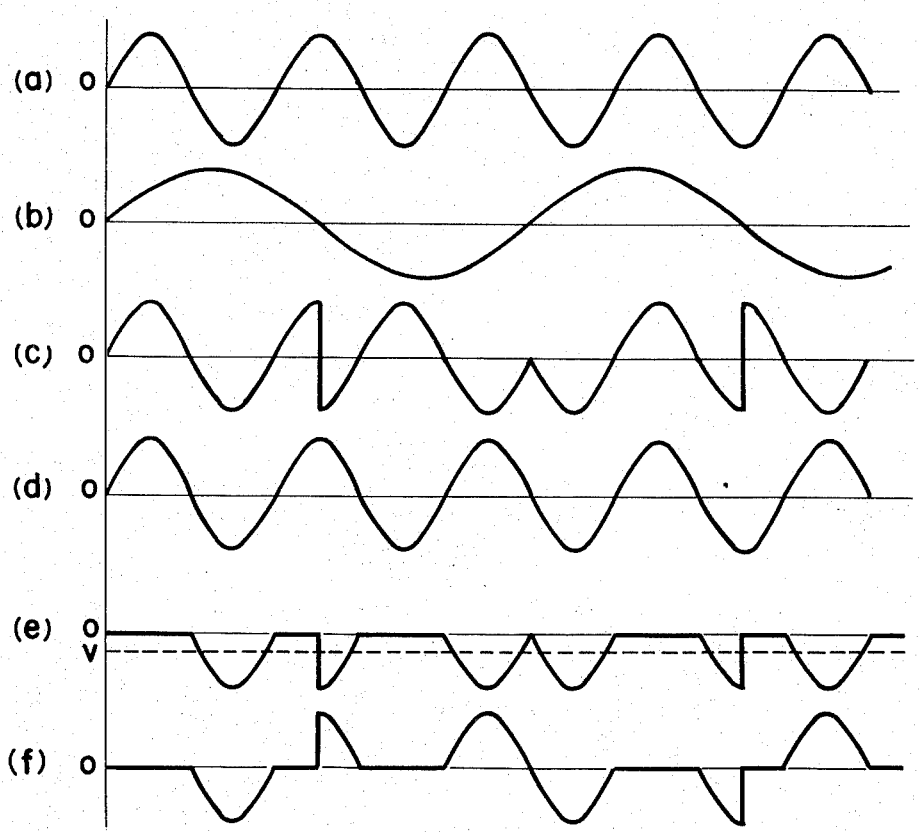
FIG. 3 is a chart of signal wave forms at various points in the embodiment of FIG. 2, when the injected signal is phase-modulated.

The operation of the circuit depicted in FIG. 2 will be better understood from the following discussion of typical waveforms present at various points in the circuit, as shown in FIG. 3. In FIG. 3, curve (a) represents the output of oscillator 11, whereas curve (b) shows the output of oscillator 12. As shown, the frequency of oscillator 11 is 2.5 times that of oscillator 12, but this is not a critical aspect of the invention. In fact, the frequency of oscillator 11 could be many times, as much as 100 times or more, that of oscillator 12. The outputs of oscillators 11 and 12 are fed to modulator 13, the output of which, signal $S_3$, is similar to the output $S_1$ of oscillator 11 except for variations in phase, as shown in curve (c) of FIG. 3. Whenever the output of oscillator 12 is negative, modulator 13 reverses the phase of $S_1$, to produce the wave from shown in FIG. 3 (c).

FIG. 3 (d) depicts an unwanted or extraneous signal of a regular pattern, which may be applied to the unknown impedance. For illustrative purposes this unwanted signal has been shown to have the same amplitude, frequency and phase as the output of oscillator 11, curve (a), but this is not essential. In fact, the unwanted signal can have any frequency, amplitude, or phase relative to $S_1$. The phase modulated output of modulator 13 (i.e., curve (c)) is injected into unknown impedance $R_x$ to be measured along with the unwanted signal (i.e., curve 3(d)). The signal developed across the unknown impedance, which is a composite of the signals due to the phase-modulated output from modulator 13 as well as the unwanted signal, is amplified and applied to an electronic switch 17. Switch 17 is keyed by the output of modulator 13 ($S_3$) in such a way that whenever the keying signal $S_3$ is positive the switch is open, i.e., there is zero output from the switch. The output signal $S_5$ from switch 17 contains a component due to the modulated input $S_3$ from modulator 13 which has the wave form indicated in FIG. 3(e), whereas the component of $S_5$ due to the unwanted signal has the form indicated in FIG. 3(f). As shown, curve (e) has pulses which are negative only and when filtered will yield an average negative DC voltage indicated by the dotted line V. In contrast, curve (f) due to the unwanted signal has both positive and negative excursions of equal value. When filtered, this signal will have a zero average value. Accordingly, the output signal $S_6$ from filter 18 contains only the component generated by modulated signal $S_3$ applied to the unknown impedance. The magnitude of the average DC value of the output from filter 18 is thus proportional to the unknown impedance $R_x$ and can be read directly by suitable calibration of meter 19.

Figure 4:
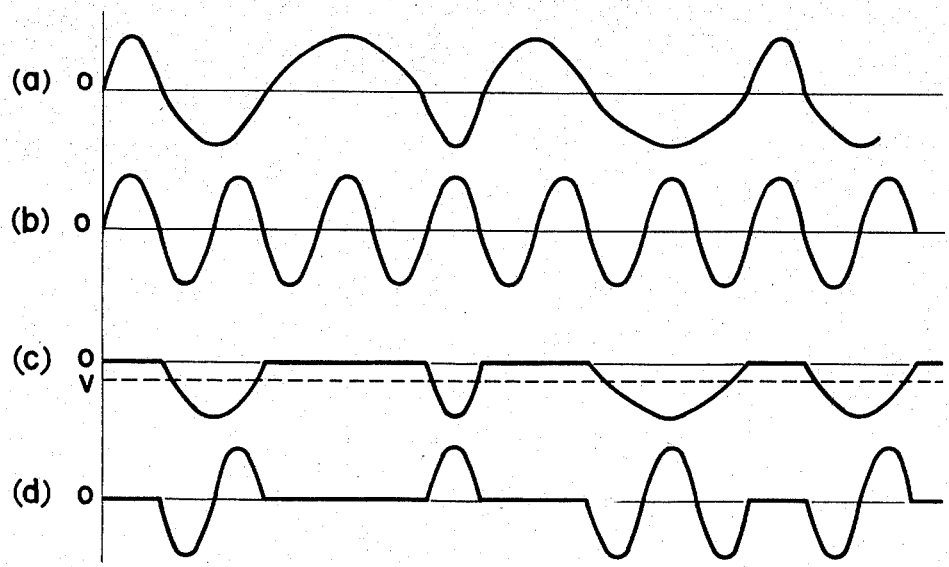
FIG. 4 is a chart of wave forms for the embodiment of FIG. 2, when the injected signal is frequency-modulated.

As an alternative to phase modulation, modulator 13 can also be used to frequency-modulate the output of oscillator 11. The wave forms developed therein are illustrated in FIG. 4. In this case, the output of oscillator 11 is frequency-modulated by the output of oscillator 12 to yield an output signal from modulator 13 having the form shown in FIG. 4(a), which is applied to $R_x$ together with an unwanted signal of regular pattern, curve (b). The resultant voltage is amplified and applied to switch 17 to which is also supplied the frequency-modulated signal $S_3$ from modulator 13. As before, switch 17 is closed only when the modulated signal from modulator 13 is negative, yielding a wave form due to the intentionally applied signal as shown in FIG. 4(c). As shown, curve (c) varies between zero and a maximum negative value; it never becomes positive. In contrast, the unwanted signal develops the wave form shown in FIG. (d) in passing through switch 17. It varies between positive and negative values of equal magnitude. It will be seen therefore that when the combined output resulting from the intentionally applied signal and the unwanted signal is supplied to filter 18, the output signal from the filter will represent only the average DC value of the signal intentionally applied to the unknown impedance $R_x$. The component of the signal entering the filter due to the unwanted signal has an average value of zero and disappears. The output from filter 18 is again read by meter 19 to indicate the magnitude of the unknown impedance.

Figure 1:
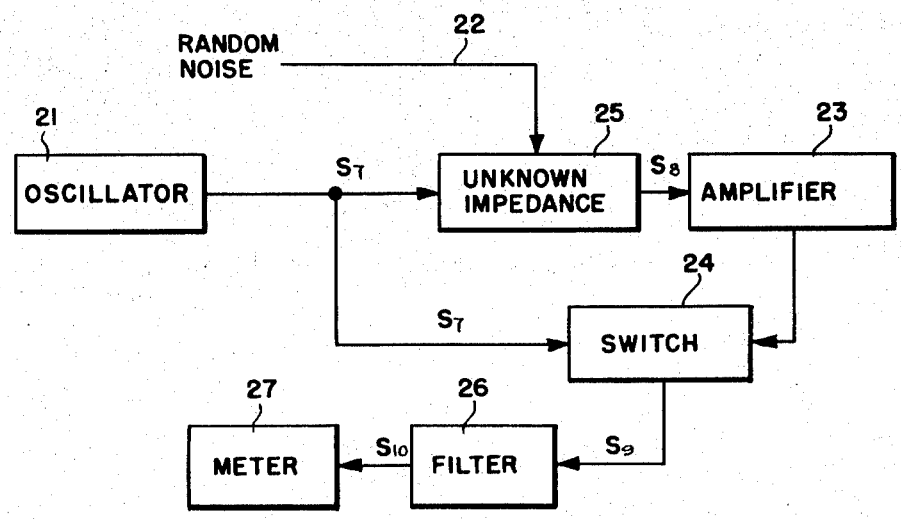
FIG. 1 is a block diagram illustrating an apparatus embodiment of the invention which can be used to measure an unknown impedance when the only interfering signal is random noise.

FIG. 1 represents an embodiment of the invention which is useful when the unwanted or extraneous signal comprises only random noise rather than a pattern of regular waveform. As a rule, random noise is composed of widely varying frequencies of many different phases, and when filtered averages to zero. Accordingly, the use of a phase-or frequency-modulated applied signal is not necessary when the unwanted signal is random noise, as shown in FIG. 1. As there depicted, the output of oscillator 21 is applied to the unknown impedance 25 ($R_x$) together with random noise 22. The voltage $S_8$ developed across the unknown impedance is amplified by amplifier 23 and supplied to switch 24 together with the signal $S_7$ directly from oscillator 21. As previously described, switch 24 is keyed by $S_7$ and is closed only when $S_7$ is negative. The output $S_9$ from the switch is filtered by filter 26 and applied to meter 27. The component of signal $S_9$ entering the filter which is due to the random noise averages to zero. Accordingly, the output signal $S_{10}$ from filter 26 represents only the signal developed across the unknown impedance $R_x$ and the reading of meter 27 represents the value of the unknown impedance.

Using the methods just described not only linear, but non-linear impedances as well can be measured. What makes this possible is the fact that the amplitude of the intentionally injected signal can be kept very much smaller than the unwanted signal, so that although the impedance is non-linear for the large signals it appears linear to the small amplitude injected signal.

Figure 5:
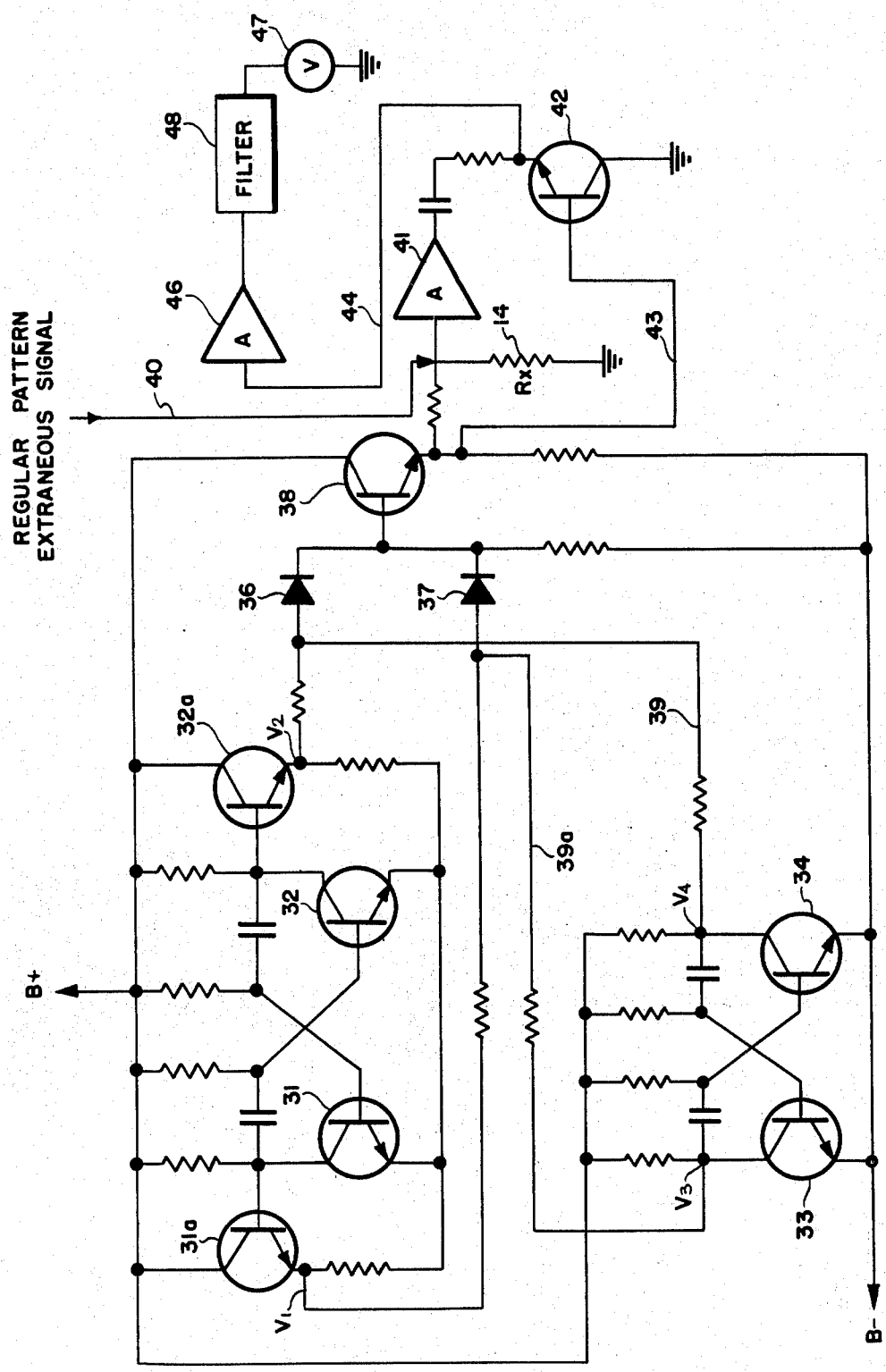
FIG. 5 is a schematic diagram of an embodiment of the invention in which the injected signal is phase-modulated.

FIG. 5 is a schematic diagram of a circuit suitable for carrying out the method of the invention employing the phase-modulated mode, as depicted in FIG. 2. In FIG. 5, transistors 31 and 32 comprise oscillator 11, while transistors 33 and 34 comprise oscillator 12 and diodes 36 and 37 comprise phase modulator 13, as shown in FIG. 2. Both of oscillators 11 and 12 are conventional multivibrators. Oscillator 11 has two outputs $V_1$ and $V_2$ (amplified by transistors 31a and 32a) which have equal amplitude but are 180° out of phase. Outputs $V_1$ and $V_2$ from oscillator 11 are supplied to the base of transistor 38 through diodes 37 and 36, respectively. In a similar manner, the outputs of oscillator 12, i.e., $V_4$ and $V_3$ are also of equal amplitude and 180° out of phase. These signals are also applied to the anodes of diodes 36 and 37 by conductors 39 and 39a respectively.

During the time when $V_3$ is positive, $V_4$ is negative so that when diode 37 is turned on by $V_3$, diode 36 is turned off by $V_4$. As a result, during such time signal $V_1$ alone appears at the base of transistor 38. During the next half cycle, $V_3$ is negative while $V_4$ is positive. As a consequence diode 36 is turned on, diode 37 is turned off and signal $V_2$ alone appears at the base of transistor 38. By this process, the input signal to transistor 38 changes phase at a frequency equal to that of the output of oscillator 12.

The output of transistor 38 is applied to the unknown impedance 14 ($R_x$) together with the unwanted signal through conductor 40 as indicated. The combined voltage developed across $R_x$ is amplified by first amplifier 41 and then applied to switching transistor 42. Transistor 42 is keyed by the output of transistor 38 through conductor 43 to its base, in such way that its output is zero whenever the output of transistor 38 is positive. The output of transistor 42 is applied by conductor 44 to second amplifier 46, then filtered in a conventional manner by filter 48 and applied to meter 47, which is suitably calibrated to indicate directly the value of the unknown impedance $R_x$.

Figure 6:
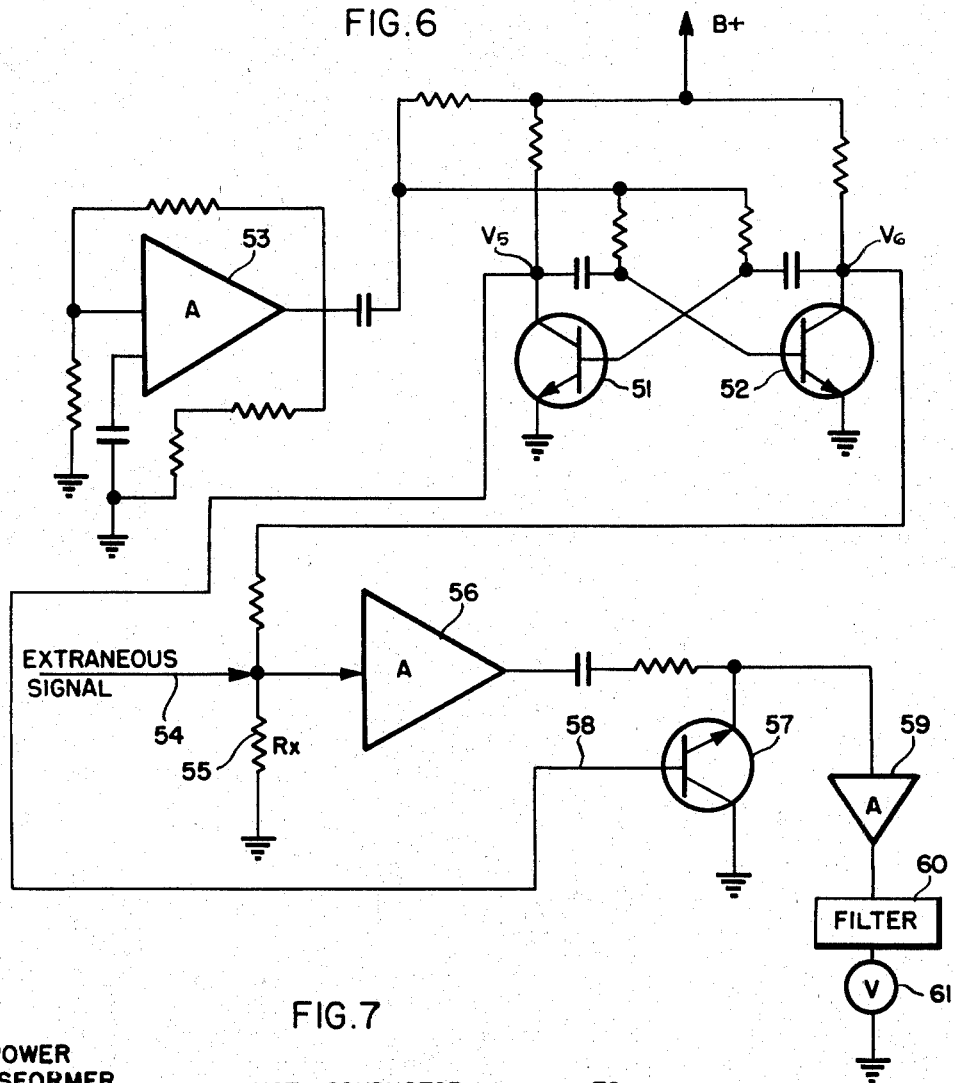
FIG. 6 is a schematic diagram of an embodiment of the invention in which the injected signal is frequency-modulated.

A schematic diagram of apparatus suitable for carrying out the method of the invention employing a frequency-modulated signal is shown in FIG. 6. In this figure, transistors 51 and 52 comprise oscillator 11 and an operational amplifier 53 with its associated resistors and capacitors comprise oscillator 12. The two oscillators are interconnected in such a manner that no additional stage is required for frequency modulation.

Oscillator 11, which is a conventional multivibrator, has two outputs $V_5$ and $V_6$. In operation, when transistor 51 is in saturation (i.e., $V_5$ is near zero), transistor 52 is non-conducting (i.e., $V_6$ is at B+) and vice versa. The frequency of $V_5$ and $V_6$ depends on the time duration of saturation and non-conduction. In the absence of a signal from amplifier 53 and with identical transistors 51 and 52 and equal values of associated resistors and capacitors, the time duration of saturation is the same as that of non-conduction at all times, so that the frequency of $V_5$ and $V_6$ is constant.

The output of amplifier 53 is coupled to the base of each of transistors 51 and 52 in such a way that it modulates the oscillation of these transistors. As a result, the frequency of $V_5$ and $V_6$ changes periodically at a rate equal to the frequency of oscillation of amplifier 53.

Signal $V_6$ from transistor 52 is applied to unknown impedance 55 ($R_x$) together with the unwanted signal 54 which may be present, as indicated. The resulting voltage developed across $R_x$ is amplified by amplifier 56 and then applied to transistor 57, which is switched on and off by signal $V_5$ supplied to its base by conductor 58. The output of transistor 57 is amplified 59, filtered 60, and applied to meter 61 which again is calibrated to read the value of impedance $R_x$ directly.

Figure 7:
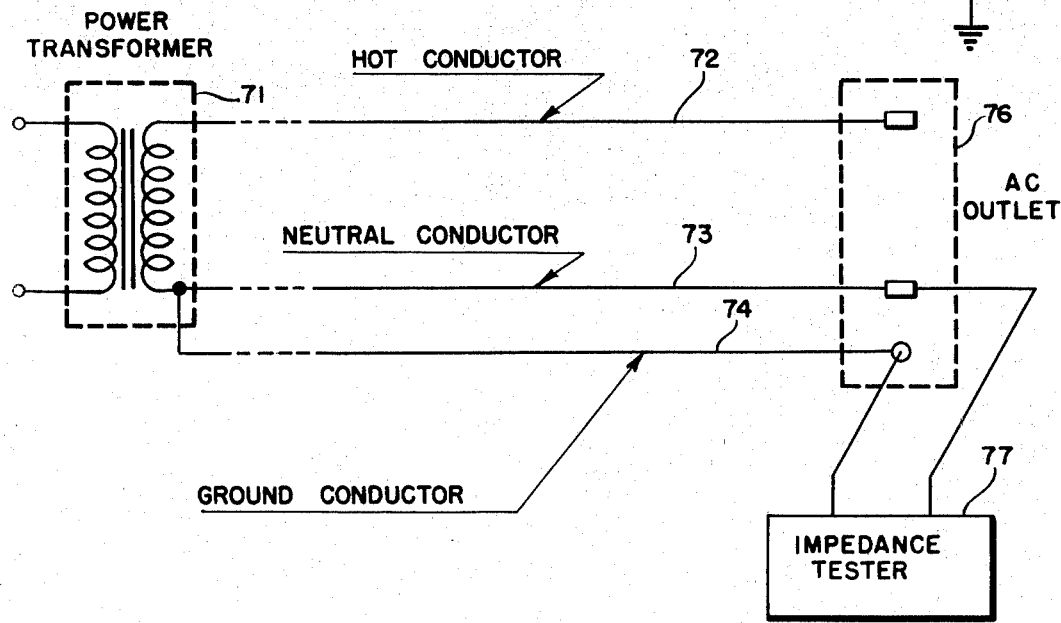
FIG. 7 is a schematic diagram of a typical use of the apparatus of the invention, in determining the impedance of the neutral-ground circuit in a three-wire power distribution system without deactivating the system.

The device and method of the invention permit measurement of impedance in electronic or electrical circuitry while power remains applied to the circuits. The impedance measuring instruments heretofore known require that no other signal be present in the impedance to be measured except the signal injected by the instrument. This requirement necessitates a shut-down of the apparatus under test, which may be inconvenient or impractical to accomplish. An example of the use of the invention is indicated schematically in FIG. 7, which illustrates the measurement of the impedance in a three-wire power system comprising a power transformer 71, hot conductor 72, neutral conductor 73, and ground conductor 74, connected to an AC outlet 76. A tester 77 in accordance with the invention is connected between ground conductor 74 and neutral conductor 73. The voltage developed in the ground conductor 74 from the point of signal injection to neutral conductor 73 drives the tester 77 to indicate the resistance of the ground conductor. Any noise in the neutral conductor 73 (e.g., from motors, lights, etc.) which may be as large as 100 decibels or more above the signal amplitude injected into ground conductor 74 will not contribute to the indication of impedance indicated by the meter. Accordingly, a power system of this type can be routinely measured for desirably low resistance in the ground conductor without the necessity for deactivating the entire system in order to run the test.

The foregoing detailed description has been given for clearness of understanding only, and no unnecessary limitations should be understood therefrom, as modifications will be obvious to those skilled in the art.

I claim:

1. A method of measuring an unknown electrical impedance in the presence of extraneous signals comprising injecting into said inknown impedance an alternating current signal, generating in said unknown impedance a first oscillating voltage signal having a magnitude proportional to said unknown impedance; applying said first oscillating voltage signal together with any extraneous voltage signal present in the unknown impedance to a switch keyed in accordance with the frequency of said current signal to be closed only during alternate half-cycles of the alternations of said current signal, whereby there is transmitted through said switch a second oscillating voltage signal; filtering said second oscillating voltage signal to convert it to a third voltage signal of constant amplitude and polarity; and measuring said third voltage signal as a measure of said unknown impedance.

2. The method of claim 1 wherein said extraneous signals are random noise.

3. The method of claim 1 wherein said current signal has a wave form produced by generating a first alternating signal $S_1$ having a frequency $f_1$, phase modulating $S_1$ in accordance with a second alternating signal $S_2$ having a frequency $f_2$ less than $f_1$, in such a manner that the modulated signal is 180° out of phase with $S_1$ during such times as $S_2$ has a given polarity.

4. The method of claim 3 wherein said extraneous signals have a regular repetitive wave form.

5. The method of claim 1 wherein said current signal has a wave form produced by generating a first alternating signal $S_1$ having a frequency $f_1$; generating a second alternating signal $S_2$ having a frequency $f_2$ less than $f_1$, and modulating the frequency of $S_1$ at a rate corresponding to the frequency of $S_2$.

6. The method of claim 5 wherein said extraneous signals have a regular repetitive wave form.

7. Apparatus for measuring an unknown impedance in the presence of extraneous signals comprising means for injecting into said unknown impedance an alternating current signal, whereby there is generated in said impedance an oscillating voltage signal having a magnitude proportional to said unknown impedance;

electronic switching means to which said generated voltage signal is applied, said switching means being keyed by said current injecting means to be closed only during alternate half-cycles of said current signals;

filtering means connected to the output of said switch for converting said output to a DC voltage;

and voltage measuring means for measuring said DC voltage as a measure of said unknown impedance.

8. The apparatus of claim 7 in which said current injection means comprises a first oscillator; a second oscillator having a frequency of operation less than that of said first oscillator; and a modulator for modulating the output of said first oscillator in accordance with the output of said second oscillator.

9. The apparatus of claim 8 in which said modulator modulates the output of said first oscillator in such a manner that the output of said modulator is 180° out of phase with the output of said first oscillator during such times as the output of said second oscillator has a given polarity.

10. The apparatus of claim 9 in which said modulator modulates the frequency of said first oscillator at a rate equal to the frequency of said second oscillator.

* * * * *